(No Model.) 2 Sheets—Sheet 1.
A. MARTINEZ.
CURVE AND CROSSING DEVICE FOR CABLE RAILWAYS.
No. 406,752. Patented July 9, 1889.
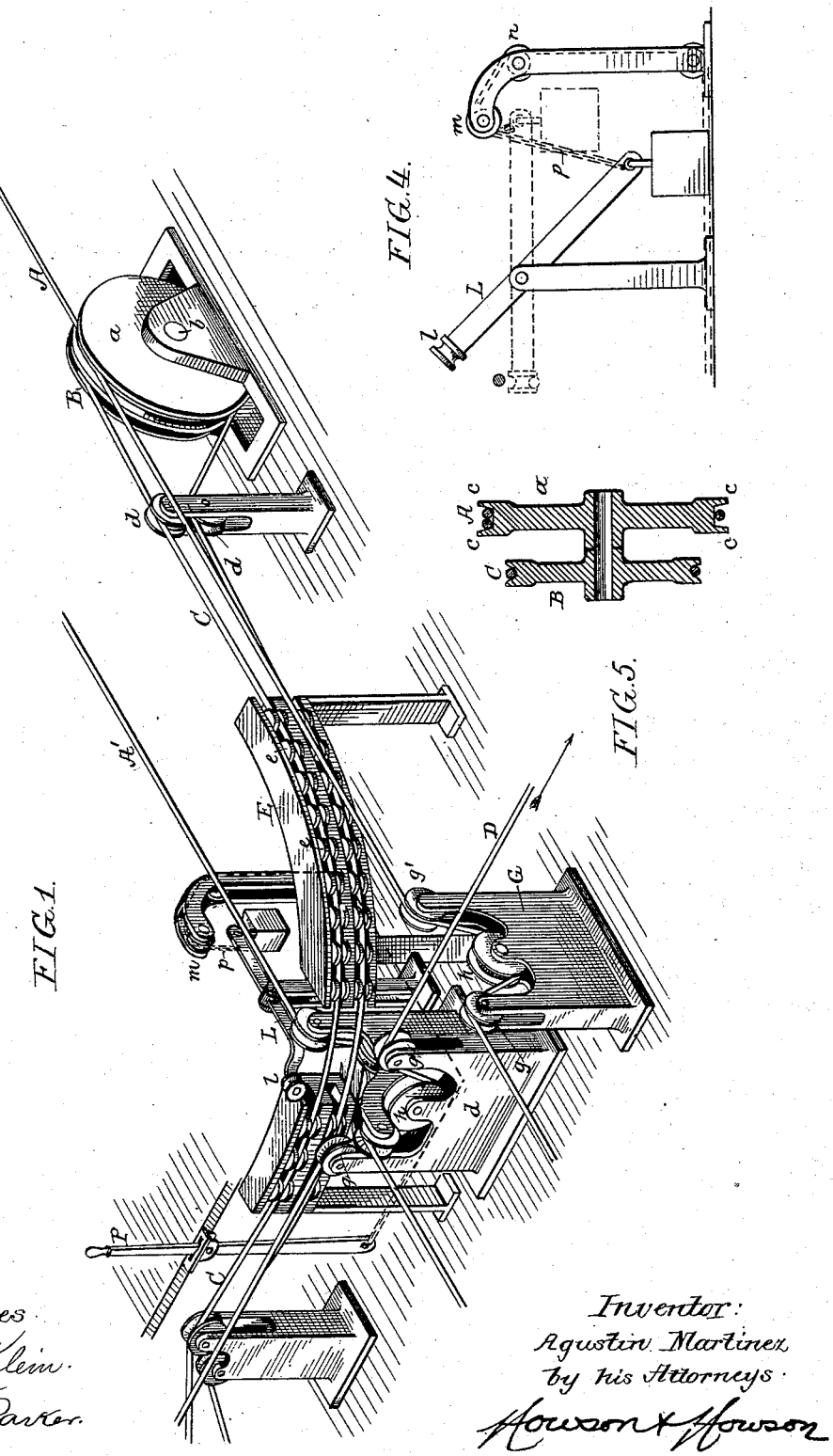
Witnesses
Jos. H. Klein.
John E. Parker.
Inventor:
Agustin Martinez
by his Attorneys
Howson & Howson

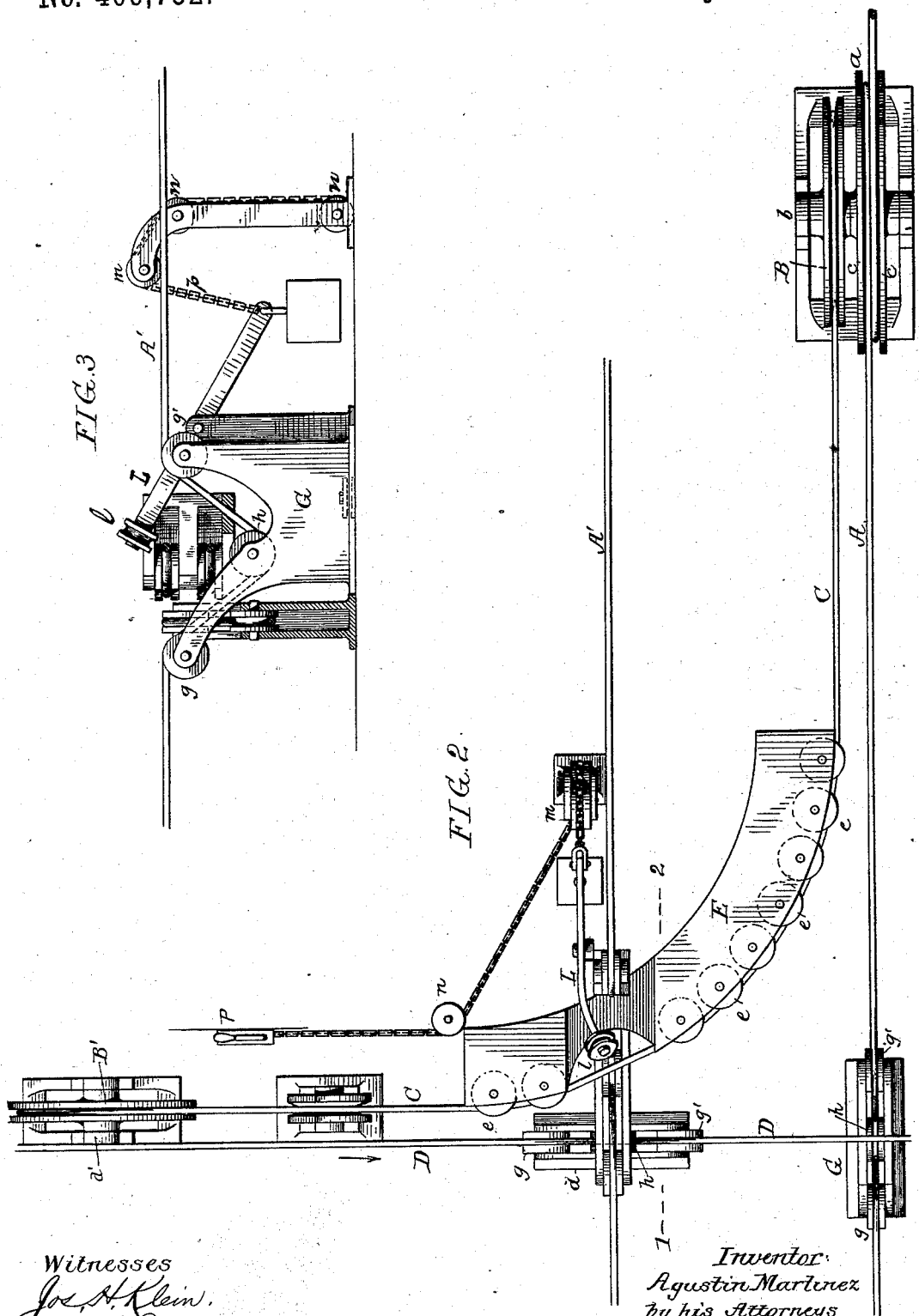

UNITED STATES PATENT OFFICE.

AGUSTIN MARTINEZ, OF PHILADELPHIA, PENNSYLVANIA.

CURVE AND CROSSING DEVICE FOR CABLE RAILWAYS.

SPECIFICATION forming part of Letters Patent No. 406,752, dated July 9, 1889.

Application filed March 29, 1889. Serial No. 305,236. (No model.)

*To all whom it may concern:*

Be it known that I, AGUSTIN MARTINEZ, a citizen of the United States, and a resident of Philadelphia, Pennsylvania, have invented certain Improvements in Curve and Crossing Devices for Cable Railways, of which the following is a specification.

My invention relates to that class of railways in which a constantly-moving cable furnishes the motive power; and the invention consists of certain improvements in the construction of such a road, its main object being to facilitate the transfer of a car from one line to another crossing at right angles by using a supplementary curve cable driven from one or other of the main lines, a further object being to so arrange the cables at the crossing-points that the hold of the grip upon the cable will have to be released for but a short distance.

The construction of the various devices for accomplishing these objects is shown in the accompanying drawings, in which—

Figure 1 is a perspective view of a cable-railway system in which two cables running parallel to each other, but in opposite directions, are crossed by a single cable running at right angles thereto. Fig. 2 is a plan view of a portion of the same on a larger scale. Fig. 3 is a section on the line 1 2, Fig. 2. Fig. 4 is an elevation of one of the cable-depressing devices, and Fig. 5 is a sectional view of the driving mechanism for the supplementary or curve cable.

One of the main cables A passes entirely around a large driving-wheel $a$, mounted vertically in suitable bearings $b$ below the cable, this wheel having a broad flat periphery, (see Fig. 5,) around which the cable passes and upon which the cable is retained by flanges $c$, the object in thus providing a broad bearing-surface for the cable being to permit the free movement of the latter and to avoid the lateral binding and frictional contact of the cable at the points where the turns lie side by side. Upon the shaft $b$ is also fixed a grooved wheel B, of the same or, if desired, of a smaller diameter than the driving-wheel $a$ and at some distance therefrom, the supplemental curve cable C passing around this wheel and being guided by idlers $d$ in such manner that the cable comes into contact with the greater portion of the periphery of said wheel B in order to insure extended frictional contact of the cable therewith. This curve cable, at its opposite end, passes around a return wheel B', mounted parallel with the direction of the crossing cable D, and held in suitable bearings $d'$ in the bottom of the conduit. A suitable curved frame E is also provided between the wheels B and B' and carries a large number of grooved sheaves $e$, around which the curve cable C is guided, and along which the grip may pass without releasing the cable when going around the curve.

The operation of this portion of the device is as follows: If a car be supposed to be traveling in the direction of the arrow on the cable D, the latter is released at the commencement of the curve and the grip engages with the supplemental curve cable C, by which the car is carried around the curve to such a position that the grip can engage with the cable A, the space between the two wheels $a$ and B being sufficient to permit the passage of the grip. Where the cables cross each other I provide a depressing device (see Figs. 1 and 3) consisting of three sheaves $g, g'$, and $h$, mounted in a pedestal G, the rope passing over the sheave $g$, thence down under the sheave $h$, and thence up to and over the sheave $g'$, the sheave $h$ being depressed the necessary distance to allow the free passage over it of the grip on the crossing cable. In Fig. 1 I have shown this depressing device acting on the cable A where it crosses the cable D, and on both cables A' and D where they cross. In Fig. 4 I have shown another form of depressing device, which is specially adapted to be used on the supplemental curve cable C, at the point shown in Fig. 1, where the cable A' crosses the same, although such device may be used at other points, if deemed necessary.

On the end of a lever L, fulcrumed at any convenient point, is mounted a small grooved wheel $l$, and to the opposite end of the lever is attached a chain or rope $p$, passing over the guiding-pulleys $m$ $n$ to a convenient point for operating the same by means of a lever P, for instance.

When used in connection with the curve cable, the action of this device is as follows: When a grip is passing on a curve cable, the wheel $l$ is in the position shown in full lines in Fig. 4 and out of contact therewith, so as to allow the grip to retain its hold on the cable while passing this point. When, however, a car is passing on the line A', the attendant operates this lever P, and by means of the chain-and-pulley connection depresses the lever L and thus moves the cable C to the position shown by dotted lines in Fig. 4, said cable then being out of the way of a grip on the line A'.

I claim as my invention—

1. In a cable-railway system, the combination of the main and crossing cables, the supplemental curve cable, a driving-wheel having a broad periphery around which the main cable passes without crowding, and a grooved wheel mounted on the same shaft with the driving-wheel and around which the curve cable passes, said grooved wheel being at a sufficient distance from the driving-wheel to permit the passage of the grip between the two wheels, substantially as specified.

2. The combination, in a cable-railway system, of a lever carrying at one of its ends a depressing-roller with an operating chain or rope and guiding-wheels for said chain or rope, substantially as described.

In testimony whereof I have signed my name to this specification in the presence of two subscribing witnesses.

AGUSTIN MARTINEZ.

Witnesses:
E. L. BOYCE,
JOHN E. PARKER.